Patented Aug. 22, 1939

2,170,417

UNITED STATES PATENT OFFICE 2,170,417

SALAD DRESSING

Harry M. Levin, Philadelphia, Pa.

No Drawing. Application May 20, 1938,
Serial No. 208,995

4 Claims. (Cl. 99—144)

My invention relates to a food product and relates particularly to a salad dressing having nutritious ingredients therein.

Heretofore, mayonnaise has been used as a source for salads, cold meats, poultry, fish, vegetables, etc., and the mayonnaise has been made of the yolk of eggs, salad oil, and vinegar. The eggs in the mayonnaise provide the nutritious value for the food. Salad dressing is a food popular as an accompaniment to a dinner or as the main luncheon dish. The salad dressing which consists of starches and vinegar has little or no vitamins or nutritious food value therein because none of the ingredients have food value.

Homemade salad dressings or salad dressings for immediate consumption have been made having milk therein for the purpose of adding food values to the salad dressing, but it has been found that milk or cream in such dressing turns sour or putrefies. In the commercial manufacture of salad dressings having a starch or other water absorbing agent together with a milk product, it has been found that the milk unless properly refrigerated will putrefy. Therefore, only dressings which omit a food building substance, or dressings which contain milk and are only used immediately upon mixing, are found to be palatable. Since salad dressings in commercial production must retain their flavor and be sterilized for an extended period of time, salad dressings although desirable have not been commercially feasible. It is also well known that a finished salad dressing sold in glass jars cannot be sterilized at a high temperature as canned goods and be kept as a perfect emulsion appearing like a smooth cream, as it would break down the emulsifying power of the eggs and release free oil.

It is, therefore, an object of my invention to provide a salad dressing which will not deteriorate and which will contain nutritious food matter.

Another object of my invention is to provide a salad dressing which has a water absorbing agent with an unpasteurized milk product which is properly processed to prevent the growth of deleterious organisms.

A further object of my invention is to sterilize a salad dressing which comprises a water absorbing agent together with a milk product.

Another object of my invention is to provide a salad dressing which contains a filler or water absorbing agent, such as starch, together with milk or cream which have a good or nutritious value and which product will remain sterile for a comparatively long period of time without the need of refrigeration and which will stand high as well as low temperatures.

Another object of my invention is to improve the flavor of the salad dressing.

A further object of my invention is to substantially eliminate the transparent and shiny appearance of the cooked starch by distributing the colloidal casein of the milk and by reducing the quantity of starch.

In accordance with my discovery, a lacteal fluid is incorporated into a salad dressing by combining it with a hydrophilic colloid and starch, the mixture treated at an elevated temperature until the milk is pasteurized and the starch sterilized, after which an acid such as lactic, acetic or citric is incorporated. The product of this process is a homogeneous viscous emulsified body with which the usual seasoning, oil, etc., may be combined.

The novel features which I consider characteristic of my invention are set forth particularly in the appended claims. The invention itself, however, both as to its composition and method of compounding, together with additional objects and advantages thereof, will best be understood from the following description of a specific embodiment.

For the purpose of aiding in the distinguishing features of my invention, the term "mayonnaise" is defined as: An emulsified food product containing eggs, oil, vinegar, spices, sugar and salt, the oil of which must necessarily be 50% by weight of the total composition and contains no water.

The term "salad dressing" may be defined as: An emulsified food product used as a mayonnaise substitute containing less than 50% of oil, which is usually replaced by a starch, gum, or any other water absorbing agent and flavored with vinegar and spices and usually contains water.

Mayonnaise base is defined as: An emulsion of oil and a small percentage of liquid having eggs and/or gum as an emulsifying agent prepared solely for subsequent mixture with processed starch for salad dressing.

In the production of my new salad dressing, the following difficulties are presented:—

(1) *Micro-organisms of milk*

These micro-organisms are minute living cells secreting chemical substances known as "enzymes". The latter is in fact regarded as normal constituents of milk. These enzymes, if not properly checked, stimulate chemical reactions in the product without becoming part of the compound formed. These organisms consist of bacteria, yeasts, and molds. To thrive they need oxygen, carbon, and water. Most require a nitrogenous diet which makes milk a very favorable medium. Further, the carbohydrates existing in salad dressings which have a high percentage of starch and sugar encourage the development of bacteria, yeasts and molds. Thus, the sugars and starches of the salad dressing are broken principally into alcohols, acids, water, carbon dioxide, and hydrogen causing fermentations and water separation, which is obviously very objectionable in salad dressing. In a nutrient material like a pure mayonnaise where the liquid concentration is low and where the oil content is high, bacterial growth will be retarded, but in salad dressing where the moisture is always over 30% the microorganism will find optimum conditions for growth.

(2) Precipitation of casein

Casein is a protein of milk. Unless special precautions are taken, the colloidal dispersed casein will coagulate and precipitate with the consequent liberation of butter fat. The curdled casein will tend to break the smooth continuous phase of the salad dressing emulsion, and the free butter fat will introduce problems of oily appearance and separation as well as that of rancidity and other objectionable characteristics in the salad dressing.

Prior to using the milk in my process, I take measures to overcome the above-mentioned difficulties, of (1) preventing the growth of microorganisms of milk and (2) the preventing of curdling of the milk.

Three forms of dispersions in milk

Bear in mind that the physical product milk has three forms of dispersions within itself. Such dispersions within milk are:—

(1) A very coarse emulsion or dispersion of fat in a water phase;

(2) The water phase itself contains a molecular dispersion of lactose and mineral sals and some lactalbumin; and (3) The protein of milk exists in a colloidal suspension.

If the globules in milk are large, coarse, and non-uniform, and such milk is mixed with starch and cooked with acid, a precipitation and fat separation would be inevitable. Therefore, I have discovered that the proper step to take is a homogenization of the milk prior to placing it into the kettle. When the milk is passed through a homogenizer, which is a milk machine used to make fine, uniform globules, there is a decided reduction in the size of the fat globules. Furthermore, the increased viscosity resulting from this process increases the resistance which the small globules must overcome to move upward. This increased viscosity is undoubtedly due to larger proportions of protein absorbed on the surface of the increased number of globules. Since the fat blobules will not rise or separate readily, they will form a uniform and smooth texture which will be a factor in resisting subsequent precipitation of casein and liberation of butter fat. Any influences tending to keep the globules small in size aid in the stability of the finished product.

After homogenizing the milk and/or the cream, I place 100 gallons of it into a stainless steel steam-jacketed kettle agitating it slowly and constantly. The kettle used prevents corrosion or any objectionable metallic flavors in the resultant product. Before placing the starch into the milk, I find it beneficial at this stage to add about one pound of dry gelatin or about one pound of powdered locust bean gum or three-quarters of a pound of finely powdered tragacanth. Any of the hereinbefore mentioned products serve as a protective film for the globules colloidally dispersed in the milk. These substances which surround each suspended globule offer sufficient resistance to the acid, such as vinegar, as to prevent the curdling of the milk proteins. I have found that these powders aforementioned add smoothness and greater stability to the dressing. I have also found them adequate to prevent coagulation of the milk albumin when heated to 185° F. as required by this process.

After the gum or gelatin is uniformly dispersed, I add the usual amount of sugar (240 pounds) and the dry corn starch. Instead of adding the usual 100 pounds of starch together with 100 gallons of water and vinegar as is used in the old process where milk is not used, I have found that the milk solids average 12.75% and the gums serve to imbibe a quantity of the aqueous media. Thus, it is only necessary to use 68 pounds of starch instead of 100 pounds, the latter quantity being used heretofore in making salad dressings. This explains the above-mentioned advantage of my improved salad dressing, since it reduces the starchy taste in a substantial manner, and it improves the appearance of the dressing.

After agitating the milk, gums, sugar, and starch for a few minutes, I turn on the steam and cook the contents at a temperature of 185° F. for about five minutes. This cooking not only pasteurizes the milk but sterilizes the starch as well. I now put sufficient edible acetic acid to the mixture so that the quantity would equal 2.2% computed on the moisture content of the milk.

If the aroma of sour milk is desired, I may add from 1% to 1½% of lactic acid in place of an equal portion of acetic acid. In adding the concentrated acid as well as salt to the milk- or cream-starch base, further caution must be exercised because both acid and salt tend to cause coagulation and precipitation upon heating. It is best to add both acid and salt when the starch paste is being cooled for milk is known to curdle at 140° F. when somewhat high in acidity. When the temperature goes below 140° F., the usual pasteurizing temperature of milk, it is best to add both salt and acid, which are the basic preventatives of putrefaction of the finished product. After the starch is cooled to about 90° F., I draw it off into a stainless steel blender using a powerful agitator. In the steel blender I mix the processed starch with a mayonnaise base previously prepared from eggs or gum, and oil, and spices. The ideal oil content of the finished dressing should be about 35% of the weight of the total composition. The salad dressing is about ready to be bottled and offered for the market at room temperature obviating the necessity for refrigeration.

My improved salad dressing contains all the food requirements necessary to human life, i. e.:—

(1) Water, (2) Carbohydrates and fats (sugar, starch, butterfat, also eggs and/or oil), (3) Protein—rich milk protein, (4) Mineral matter—calcium, and ash, potassium, magnesium, and sodium, (5) Vitamins—accessories to growth and health of children.

The finished product not only has great food value and is rich in essential vitamins, but it also has a distinctive mellow flavor and is creamy in appearance with a butter-like texture. It does not have the transparent shine characteristic of all salad dressings. Containing milk casein, the new salad dressing has a greater and more stable emulsion enabling it to endure vibrations in transit and which can be featured by grocers on their counters at any room temperature.

It is sufficiently within the scope of my invention that the salad dressing contains any water absorbing agent combined with milk and/or cream and treated with acid or vinegar to keep it from putrefaction under room temperature for as long a time as is possible with all mayonnaise or salad dressing.

*Modification*

It may be preferable to substitute part or all of the water with milk and/or cream, or dry milk, or dry cream, in order to retain the vinegar for flavor instead of edible acids. The aim here is to retain all the cider or white vinegar for their flavor in lieu of the organic edible acids. Instead of using 100 gallons of milk I use 78 gallons of milk and add to the latter 22 gallons of 100 grain (10%) vinegar, or I modify the proportions when using cider, which has only a maximum of 60 grain or 6% acidity. The deficiency of milk, i. e. that difference between 100 and 78 or 22 gallons may be supplied by concentrated cream or even dry milk or cream, thereby keeping the liquid phase down to the 100 gallons. At this stage, I find it advantageous not to introduce the powdered cream or milk into the kettle since heating the milk or cream with vinegar might tend to liberate the butter fat of the cream and precipitate the casein. The best way to incorporate the milk or cream into the dressing is to emulsify it into the mayonnaise base. I find it desirable to place a proper portion of dry milk into the oil prior to emulsification and to disperse it by stirring each particle of cream as lubricated. Accordingly, when the stream of oil goes into the mayonnaise mixing machine, the particles of cream are incorporated into the mayonnaise emulsion with the particles of oil uniformly and evenly and smoothly distributed. This mayonnaise base when mixed with the starch base results in a perfect dressing as good as by the first method containing the same food value and yet possessing the spiced vinegar aroma instead of that of acid.

The dry milk may be incorporated into the dressing advantageously by another method. Before homogenizing the milk, disperse and dissolve the powder in the milk. By putting the mixture through the homogenizer, the finished milk will be viscous but will contain no lumps or particles. Bearing in mind that when using vinegar instead of acid, you cannot wait with 22 gallons or more of vinegar until after the product is cooked as with the acid. The finished starch base will not be able to absorb much liquid after it is cooked. Since it can only accomplish it while cooking, the vinegar must be added before the steam is turned on. But it should be added after the gums, sugar and starches are well dispersed in the milk in order that it may successfully combat the tendency of the vinegar to precipitate the milk casein.

I do not limit myself to any proportions of either milk or cream or to any kinds of milk or cream. Any milk product which, regardless of quantity, serves the object or objects outlined above comes within the scope of my invention.

Although my invention and discovery has been described in considerable detail, it is to be limited only by the spirit of the appended claims.

I claim as my invention and discovery:

1. A homogeneous viscous emulsified salad dressing base comprising substantially the following proportions: 100 gallons of a lacteal fluid, 68 pounds of starch, ¾ to 1 pound of hydrophillic colloid and a small proportion of an acid selected from the group consisting of acetic acid, lactic acid and citric acid.

2. A homogeneous viscous emulsified salad dressing base comprising a lacteal fluid, a starch in sufficient proportions to impart a semi-solid consistency to said fluid, a small amount of a hydrophillic colloid and a small proportion of an acid selected from the group consisting of acetic acid, lactic acid and citric acid.

3. A method of incorporating lacteal fluid into a salad dressing base comprising the following steps: homogenizing a lacteal fluid, combining a hydrophillic colloid and starch therewith, treating the mixture at an elevated temperature until the ingredients are substantially sterilized, cooling the mixture, and adding a small proportion of an acid selected from the group consisting of lactic acid, acetic acid and citric acid.

4. A method of processing a salad dressing containing a lacteal fluid comprising homogeneously dispersing corn starch and a hydrophillic protective colloid in a lacteal fluid by agitating and heating the mixture to substantially 185° F. and holding it at that temperature for substantially five minutes.

HARRY M. LEVIN.